US010150046B1

(12) United States Patent
Lodal et al.

(10) Patent No.: US 10,150,046 B1
(45) Date of Patent: Dec. 11, 2018

(54) SYSTEM AND METHOD FOR AN EDIBLE PIÑATA

(71) Applicant: Julio & Sons Company, Irving, TX (US)

(72) Inventors: Scott Christopher Lodal, Fort Worth, TX (US); Ronald Wilfredo Vasquez-Zelaya, Fairfax, VA (US); Richard Lee Roberts, Jr., Coppell, TX (US)

(73) Assignee: JULIO & SONS COMPANY, Irving, TX (US)

( * ) Notice: Subject to any disclaimer, the term of this patent is extended or adjusted under 35 U.S.C. 154(b) by 0 days.

(21) Appl. No.: 15/493,065

(22) Filed: Apr. 20, 2017

Related U.S. Application Data

(60) Provisional application No. 62/355,735, filed on Jun. 28, 2016.

(51) Int. Cl.
*A63H 37/00* (2006.01)
*A23P 20/25* (2016.01)
*A23P 20/10* (2016.01)

(52) U.S. Cl.
CPC ............ *A63H 37/00* (2013.01); *A23P 20/10* (2016.08); *A23P 20/25* (2016.08)

(58) Field of Classification Search
None
See application file for complete search history.

(56) References Cited

U.S. PATENT DOCUMENTS

| 211,420 | A | | 1/1879 | Moses |
| 294,575 | A | | 3/1884 | Britton |
| 1,301,118 | A | | 4/1919 | Gartner |
| 3,821,423 | A | | 6/1974 | Jamin |
| 4,832,337 | A | | 5/1989 | Estrada |
| 5,332,605 | A | | 7/1994 | DeLamar |
| 5,558,895 | A | | 9/1996 | Boyhan |
| 5,792,496 | A | | 8/1998 | Fekete et al. |
| 6,024,995 | A | | 2/2000 | Rosso |
| 6,099,872 | A | | 8/2000 | Whetstone, Jr. |
| D481,265 | S | * | 10/2003 | Ancona .......................... D7/601 |
| 6,685,146 | B1 | | 2/2004 | Sanchez, Jr. |
| 6,978,974 | B1 | | 12/2005 | Marasco |
| 7,404,978 | B2 | | 7/2008 | Mansuino |
| 8,124,151 | B2 | | 2/2012 | Knobel |

(Continued)

OTHER PUBLICATIONS

Parenting, "4 way with balloon piñatas," Parenting, Spring 2012, pp. 58-59; http://www.resene.co.nz/pdf/Parenting/4-ways-with-balloon-pinatas.pdf, downloaded Nov. 13, 2017.*

(Continued)

*Primary Examiner* — Elizabeth Gwartney
(74) *Attorney, Agent, or Firm* — Foley & Lardner LLP

(57) ABSTRACT

An edible piñata system may have an edible piñata including edible upper and lower shells, a hanging rod for attaching the edible piñata to a hanging assembly, a support plate for supporting the edible piñata and edible contents, and the hanging assembly for supporting the edible piñata, hanging rod, and support plate to suspend the edible piñata for consumption. The edible piñata system may be made by a method for producing an edible piñata.

7 Claims, 24 Drawing Sheets

(56) References Cited

U.S. PATENT DOCUMENTS

| | | |
|---|---|---|
| 9,156,664 B1 | 10/2015 | Lopez |
| 2012/0312937 A1* | 12/2012 | Weber .................. A63L 367/10 248/125.2 |
| 2012/0321750 A1 | 12/2012 | Klene |
| 2015/0272158 A1 | 10/2015 | Vaccarella et al. |

OTHER PUBLICATIONS

MYCUPCAKEADDICTION, "Video: How to Make a Giant Cupcake Piñata"—Cake Journal, Nov. 25, 2013; https://web.archive.org/web/20131127143111/https://cakejournal.com/tutorials/giant-cupcake-piñata /, downloaded Nov. 13, 2017.*

Baird, Heather, Edible Paper Mâché Easter Egg Piñata, Mar. 11, 2016. [retrieved on May 6, 2016]. Retrieved from the Internet, http://www.sprinklebakes.com/2016/03/edible-paper-mache-easter-egg-pinata.html, 19 pgs.

Brosco, Judy, Edible Pumpkin Pinata, Published Oct. 3, 2013, [retrieved on May 6, 2016]. Retrieved from the Internet, http://seasonofsweets.com/2013/10/edible-pumpkin-pinata/, 5 pgs.

Iancu, Oana, Chocolate Christmas Tree Edible Piñata, Dec. 28, 2015 by Adore Foods, [retrieved on May 6, 2016]. Retrieved from the Internet, http://www.adorefoods.com/chocolate-christmas-tree-edible-pinta/, 11 pgs.

Knudsen, Kathy, Smash Hit Choc Cheesecake, Dec. 2012, [retrieved on May 6, 2016]. Retrieved from the Internet, http://www.taste.com.au/recipes/31937/smash+hit+choc+cheesecake, 5 pgs.

Seigne, Tricia, Piñata Cake. Fun. Fun. Fun. Posted on May 3, 2011, [retrieved on May 6, 2016]. Retrieved from the Internet, https://isinginthekitchen.com/2011/05/03/pinata-cake-fun-fun-fun/, 6 pgs.

* cited by examiner

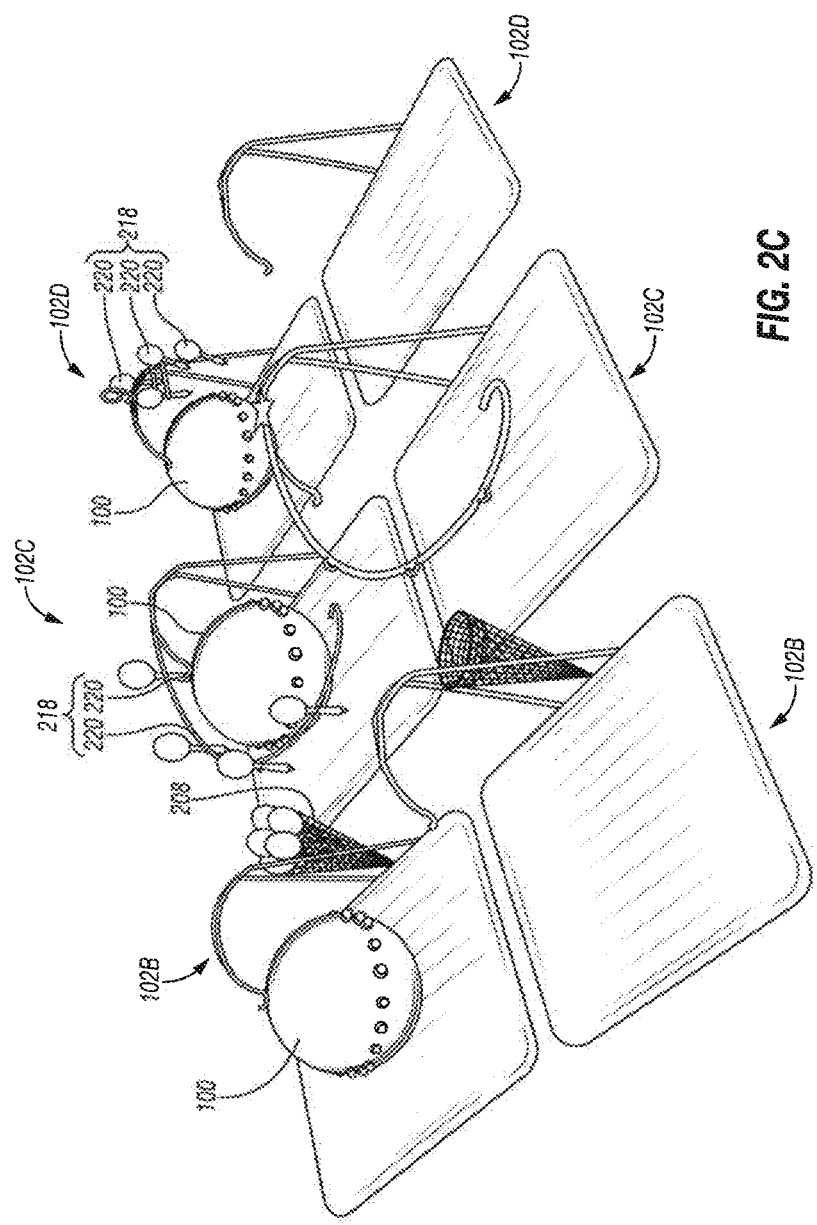

SYSTEM AND METHOD FOR AN EDIBLE PIÑATA

CROSS-REFERENCE TO RELATED APPLICATION

This application claims priority to, and the benefit of, U.S. Provisional Application Ser. No. 62/355,735 entitled "SYSTEM AND METHOD FOR AN EDIBLE PINATA" and filed on Jun. 28, 2016, the contents of which are hereby incorporated herein by reference in their entirety for any purpose.

FIELD

The present disclosure relates generally to a system and method for producing an edible piñata.

BACKGROUND

The statements in this section merely provide background information related to the present disclosure and may not constitute prior art.

A conventional piñata is an item that is formed having a hollow interior that is filled with items. The piñata is suspended from a height and then broken open by a user to release the contents of the piñata. Edible versions of a piñata have been provided wherein the outer shell of the piñata is formed of an edible material. These known edible piñatas, however, are generally unsuitable for all intended uses. For example, known edible piñatas are often incapable of being sufficiently suspended so that they may be properly broken and consumed. As a result, there exists a need for a system and method for producing an edible piñata.

SUMMARY

A system as disclosed may include an edible piñata including an edible upper shell and an edible lower shell, a hanging rod for attaching the edible piñata to a hanging assembly, and a support plate for supporting the edible piñata. The hanging assembly may be configured to support the edible piñata, hanging rod, and support plate to suspend the edible piñata for consumption.

An edible piñata as disclosed may include an edible upper shell, an edible lower shell, and a seam. The edible upper shell may include a first layer of edible material providing a substantially uniform body, an uppermost surface including a region of the first layer and wherein a hole is defined through the uppermost surface for receiving a hanging rod, and a rim including a distal edge of the first layer of edible material disposed opposite the uppermost surface and joinable to a lower shell. The edible lower shell may include a first layer of edible material providing a substantially uniform body, a lowermost surface including a region of the second layer and wherein an opening is defined through the uppermost surface for receiving an edible filling, and a rim including a distal edge of the first layer of edible material disposed opposite the lowermost surface and joinable to the rim of the upper shell. The seam may include a melted edible material fusing the rim of the edible upper shell and the rim of the edible lower shell along a circumference of the rims.

A hanging assembly for suspending an edible piñata is disclosed. The hanging assembly may include a first arm, a second arm, a neck portion, and a hook portion. The first arm may include a first support member extending perpendicularly to the first arm, the first support member configured to be received within a base tray whereby the first arm is configured to extend upwardly from the base tray. The second arm may include a second support member extending perpendicularly to the first arm, the second support member configured to be received within the base tray whereby the second arm is configured to extend upwardly away from the base tray. The neck portion may be extending away from a distal end of the first arm and a distal end of the second arm. The hook portion may include a hook disposed at a distal end of the neck portion and configured to support an edible piñata.

A method for producing an edible piñata may include creating upper and lower piñata shells, combining the upper and lower piñata shells to form a complete piñata shell, forming a hole in a top surface of the complete piñata shell, and inserting a hanging rod into the complete piñata shell. The method may further include filling the complete piñata shell with edible contents, attaching a support plate to the hanging rod at the bottom of the complete piñata shell, attaching a hanging assembly to a base tray, and attaching the hanging rod and edible piñata to the hanging assembly to suspend the edible piñata for consumption.

Further embodiments and apparatuses, including other areas of applicability, will become apparent from the description provided herein. It should be understood that the description and specific examples are intended for purposes of illustration only and are not intended to limit the scope of the present disclosure in any manner.

BRIEF DESCRIPTION OF THE DRAWINGS

For a more complete understanding of various embodiments of the present disclosure and the advantages thereof, reference is now made to the following brief description, taken in connection with the accompanying drawings, appendices and detailed description, wherein like reference numerals represent like parts, and in which:

FIG. 2C illustrates example embodiments of a hanging assembly with a basket, a hanging assembly having a spiral mallet rack, and a hanging assembly having spaced mallet hangers;

DETAILED DESCRIPTION

Figure 1:
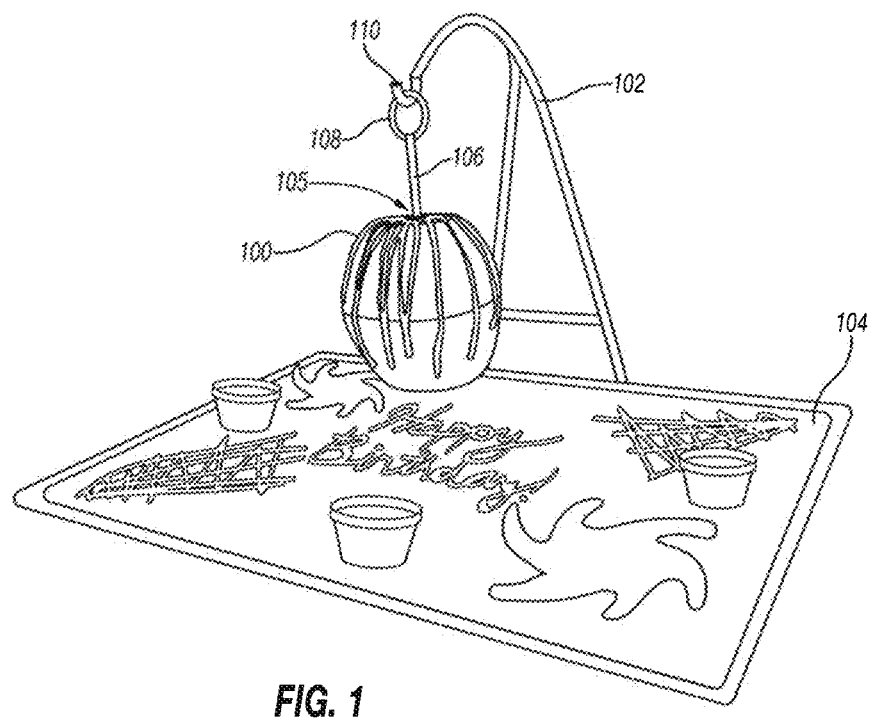
FIG. 1 illustrates an example embodiment of an edible piñata suspended in accordance with an embodiment of the present disclosure.

The present disclosure is generally described in detail with reference to embodiments illustrated in the drawings and appendices. However, other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Referring now to FIG. 1, an example embodiment of an edible piñata 100 is illustrated in accordance with an embodiment of the present disclosure. The edible piñata 100 is shown in its fully assembled form, wherein the edible piñata 100 is suspended from a hanging assembly 102 that is mounted to a base tray 104. The edible piñata 100 is connected to the hanging assembly 102 via a hanging rod 106 that extends through the edible piñata 100 from a hole 105 at the top of the edible piñata 100 to a bottom surface of the edible piñata 100. The hanging rod 106 includes a ring portion 108 that is attached to a hook portion 110 of the hanging assembly 102. Although it is not shown in FIG. 1, the hanging rod 106 includes a threaded portion located at an end of the hanging rod 106 opposite the ring portion 108. The threaded portion is attached to a support plate located at the bottom of the edible piñata 100. The support plate supports the base of the edible piñata 100, and distributes the weight of the edible piñata 100 (including the piñata's filling/contents) to the support plate, hanging rod 106, hanging assembly 102, and base tray 104. This relieves the structure of the edible piñata 100 from the weight of the piñata and its contents, which allows the edible piñata 100 to be formed from edible materials, which tend to be brittle and otherwise incapable of being suspended with a filling contained therein.

Figure 2A:
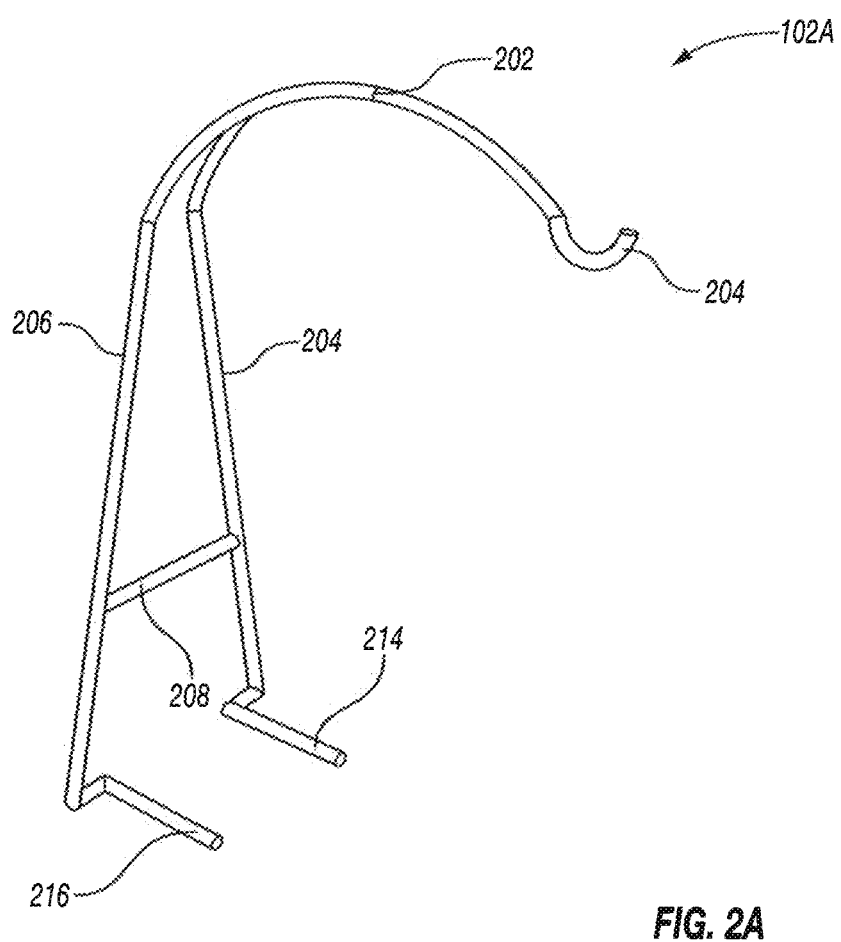
FIG. 2A illustrates an example embodiment of a hanging assembly.

FIG. 2A illustrates an example embodiment of the hanging assembly 102A. The hanging assembly 102A includes a hook portion 110 for retaining and suspending the hanging rod 106 and edible piñata 100. The hook portion 110 is connected to a neck portion 202, which is supported by two arms 204 and 206. The arms 204 and 206 are connected at the neck portion 202 and a structurally reinforcing cross bar member 208. At the end of the first arm 204 is a first support member 214, and at the end of the second arm 206 is a second support member 216. In some embodiments, the hanging assembly 102A is connected or attached to the base tray 104 by inserting the first and second support members 214 and 216 into openings in the base tray 104 (see, for example, FIG. 4). In other embodiments, the hanging assembly 102A is connected or attached to the base tray 104 by inserting the first and second support members 214 and 216 underneath the base tray 104. The hanging assembly 102A may be formed of any sturdy material such as, for example, hardened plastic or stainless steel.

Figure 2B:
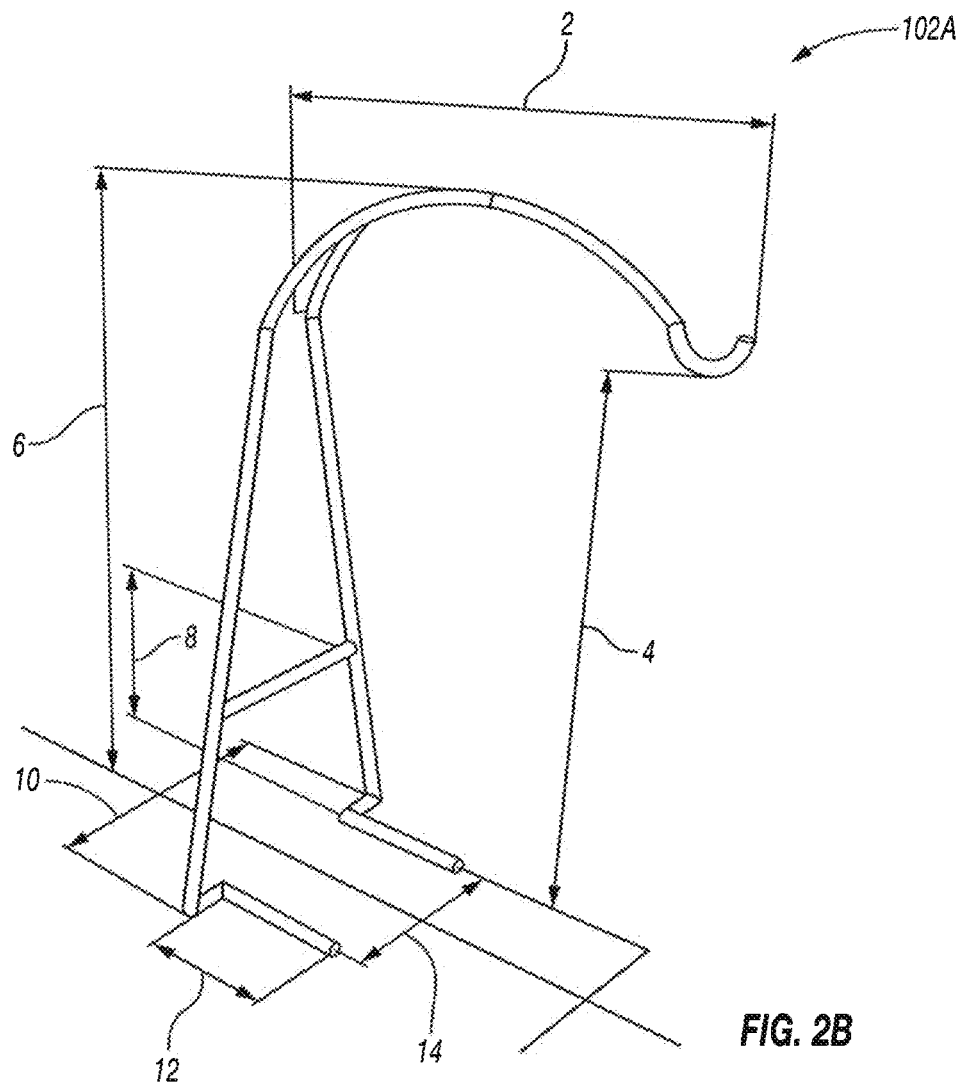
FIG. 2B illustrates example dimensions of an example embodiment of a hanging assembly according to FIG. 2A.

With additional reference to FIG. 2B, various example dimensions of a hanging assembly 102A are shown. For example a hanging assembly 102A may have a neck portion overhang distance 2. The neck portion overhang distance 2 is a measurement in a direction parallel to a surface of the base tray 104 measured between the beginning of the hook portion 110 where the hook portion 110 joins to the two arms 204 and 206. The hook portion 110 which is connected to the opposite end of the neck portion 202 may be elevated a hook portion height 4 above the surface of the base tray 104, as measured in a direction perpendicular to the surface of the base tray 104. Because the neck portion 202, may in various embodiments be curved, extending curvingly upward from the arms 204 and 206 and curvingly downward toward the base tray 104, terminating in the hook portion 110, the neck portion 202 may have an apex, the distance from the apex to the base tray 104 being the neck portion elevation distance 6. As mentioned, the arms 204 and 206 may be connected at a structurally reinforcing cross bar member 208 extending between the arms 204 and 206 at a position elevated upwardly relative to the base tray 104 by a cross bar member elevation distance 8. Moreover, the arms 204 and 206 may adjoin to the first and second support members 214 and 216 at points in space separated by an aft support member separation distance 10 measured parallel to the surface of the base tray 104, whereas the first and second support members 214 and 216 maybe spaced in a parallel direction apart by a support member channel spacing 14, which may in various embodiments be less than the aft support member separation distance 10. Finally, the first and second support members 214 and 216 may extend and penetrate into openings in the base tray 104, thus the first and second support members 214 and 216 may each have a length, for instance, a support member penetration length 12.

In various example embodiments, the various distances may have particular magnitudes. For instance, a neck portion overhang distance 2 may comprise a distance between about 10 inches (about 25.4 cm) and 11 about inches (about 27.94 cm). For example, a neck portion overhang distance 2 may comprise about 10.25 inches (about 26.035 cm). In various embodiments, a hook portion height 4 may be a distance between about 12 inches (about 30.48 cm) and about 14 inches (about 35.56 cm). For example, a hook portion height 4 may comprise about 13 inches (about 33.02 cm). A neck portion elevation distance 6 may comprise a distance between about 15 inches (about 38.1 cm) and about 17 inches (about 43.18 cm). For example, a neck portion elevation distance 6 may comprise about 16 inches (about 40.61 cm). A cross bar member elevation distance 8 may comprise a distance between about 3 inches and about 5 inches. For example, a cross bar member elevation distance 8 may comprise about 4 inches (about 10.16 cm). An aft support member separation distance 10 may comprise a distance between about 7 inches (about 17.78 cm) and about 9 inches (about 22.86 cm). In various embodiments, the aft support member separation distance 10 comprises about 8 inches (about 20.32 cm). In various instances a support member penetration length 12 comprises a distance between about 2 inches (about 5.08 cm) and about 4 inches (about 10.16 cm). In various instances, a support member penetration length 12 comprises about 3 inches (about 7.62 cm). A support member channel spacing 14 may comprise a distance between about 5 inches (about 12.7 cm) and about 7 inches (about 17.78 cm). For example, a support member channel spacing 14 may comprise about 6 inches (about 15.24 cm).

With reference to FIG. 2C, various further example embodiments of a hanging assembly 102 are shown, such as a hanging assembly with a basket 102B, a hanging assembly having a spiral mallet rack 102C, and a hanging assembly having spaced mallet hangers 102D. In various embodiments, each of the hanging assemblies discussed herein may contain one or more of the features of hanging assembly 102A, and may contain one or more further or different features. For example, a hanging assembly with a basket 102B may comprise a mallet basket 209 attached to one or both of the first arm 204 and second arm 206 to support mallets for breaking an edible piñata 100. Moreover, a hanging assembly having a spiral mallet rack 102C may have a mallet rack 218 comprising a spiral rod extending helically around at least a portion of an edible piñata 100 and extending from at least one of the neck portion 202 and the first arm 204 and second arm 206 of the hanging assembly having a spiral mallet rack 102C. One or more mallet rings 220 comprising an annulus configured to receive and support a mallet may be spaced along the mallet rack 218. Finally, a hanging assembly having spaced mallet hangers 102D may comprise a mallet rack 218 comprising an array of individual mallet rings 220 affixed to at least one of the neck portion 202, the first arm 204, the second arm 206, and/or associated shafts extending therefrom.

Figure 2D:
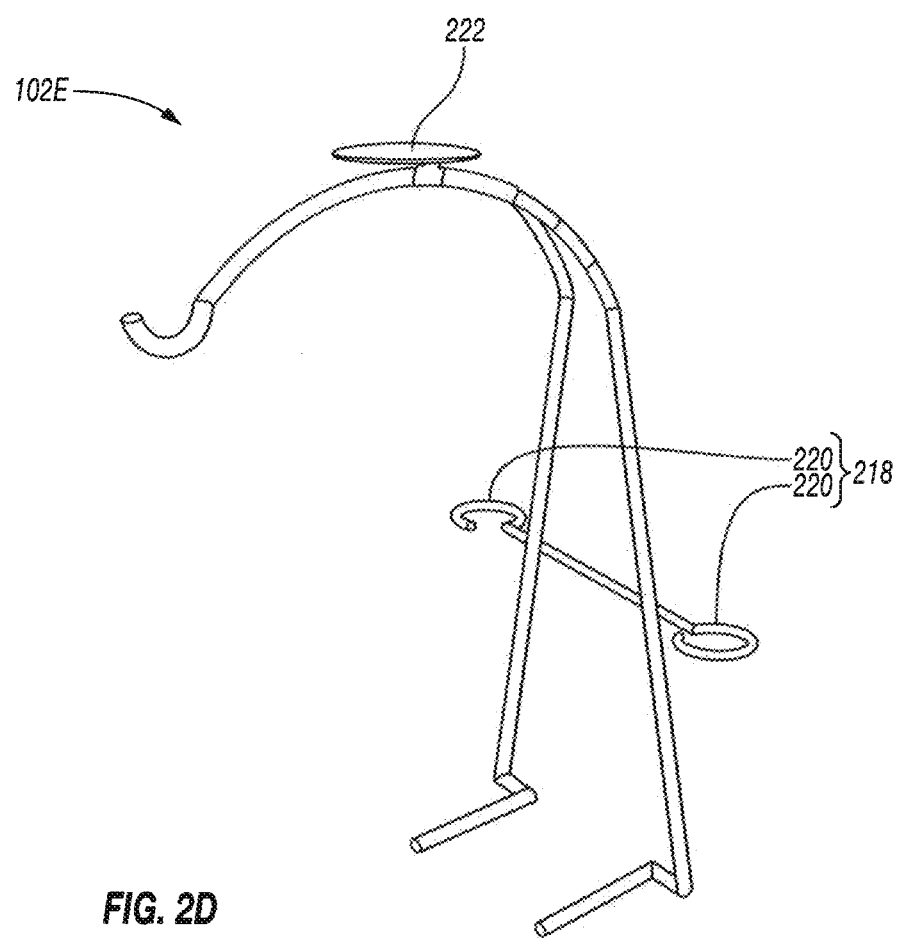
FIG. 2D illustrates an example embodiment of a hanging assembly having an upper candle plate.

With reference to FIG. 2D, a further example embodiment of a hanging assembly 102 is shown, specifically a hanging assembly with an upper candle rack 102E. A hanging assembly with an upper candle rack 102E may comprise each aspect of a hanging assembly 102A and further include a rod, plate (as illustrated), ring, or other structure disposed on the top of the neck portion 202, for example, at its apex, and configured to support one or more candle. In various instances, a mallet rack 218 comprising a shaft extending from at least one of the first arm 204 and the second arm 206 and comprising a mallet ring 220 at each distal end of the shaft may also be included.

Figure 2E:
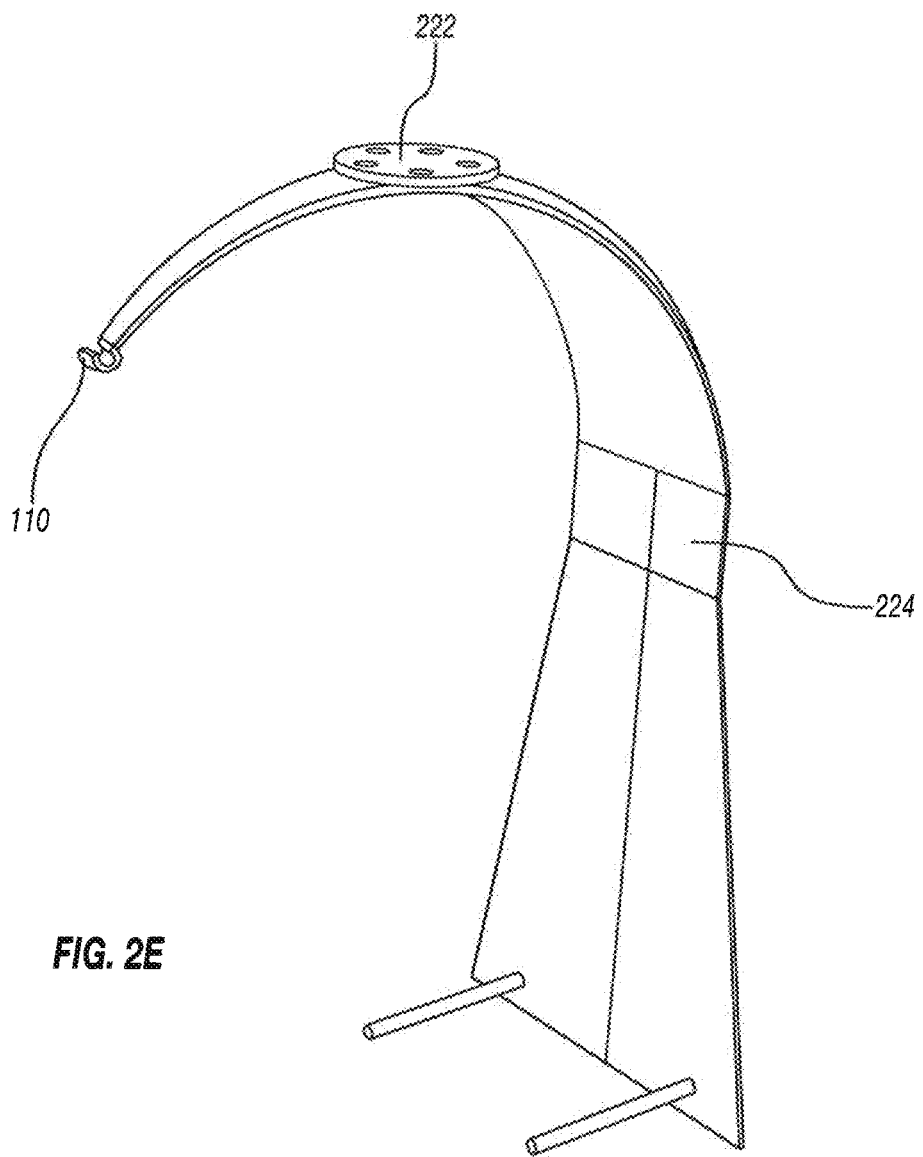
FIG. 2E illustrates an example embodiment of a hanging assembly having a unibody construction.

With reference to FIG. 2E, a yet further example embodiment of a hanging assembly 102 is shown, specifically a hanging assembly with a unibody construction 102F. A hanging assembly with a unibody construction 102F may comprise a single unitary piece of material 224 terminating in a hook portion 110, rather than the combination of arms and members of the hanging assembly 102A. The hanging assembly with a unibody construction 102F may comprise an upper candle rack 222 such as a rod, plate (as illustrated), ring, or other structure disposed on the top of the neck portion 202, for example, at its apex, and configured to support one or more candle.

Figure 2F:
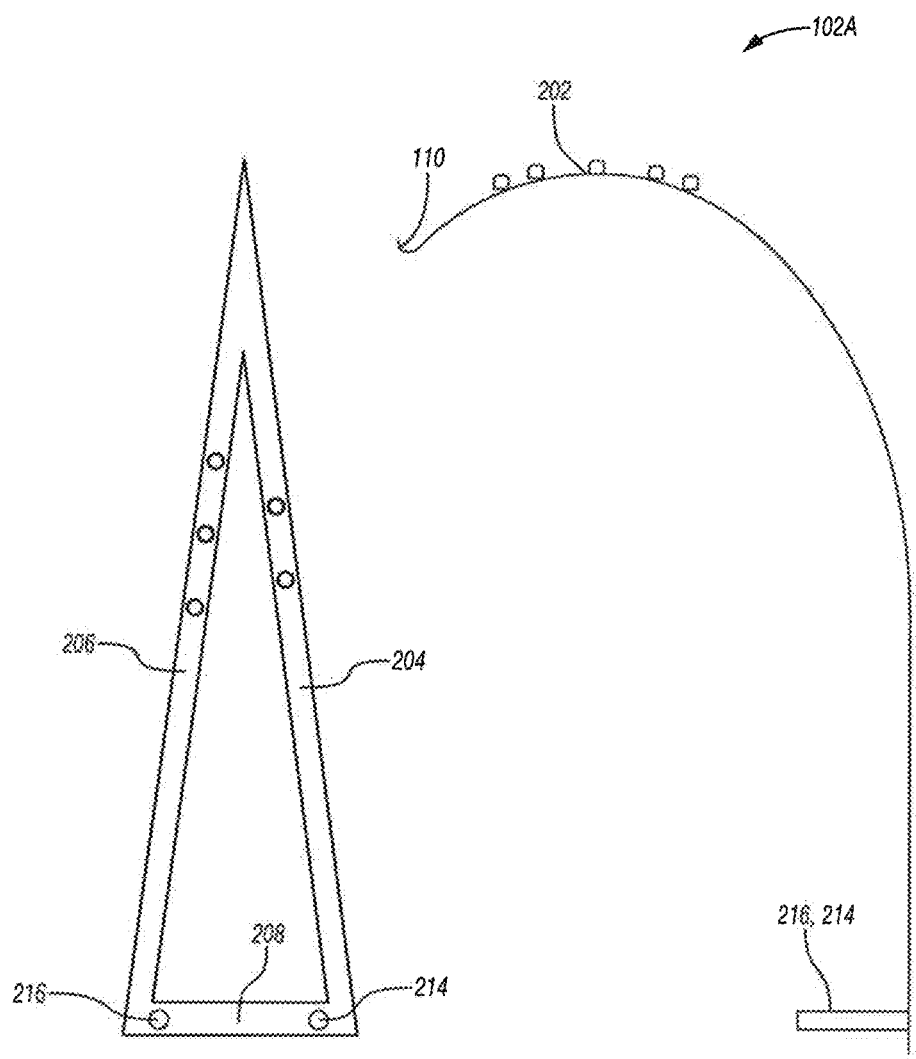
FIG. 2F illustrates an example embodiment of a hanging assembly having a linear candle support.

With reference to FIG. 2F, a still further example embodiment of a hanging assembly 102 is shown, specifically a hanging assembly having a linear candle support 102G. A hanging assembly having a linear candle support 102G may comprise each aspect of a hanging assembly 102A and may further include a plurality of candle holders 223. Specifically, a plurality of candle holders 223 each comprising a receptacle to receive a candle, may be spaced linearly along at least one of first arm 204 and/or second arm 206.

Figure 2G:
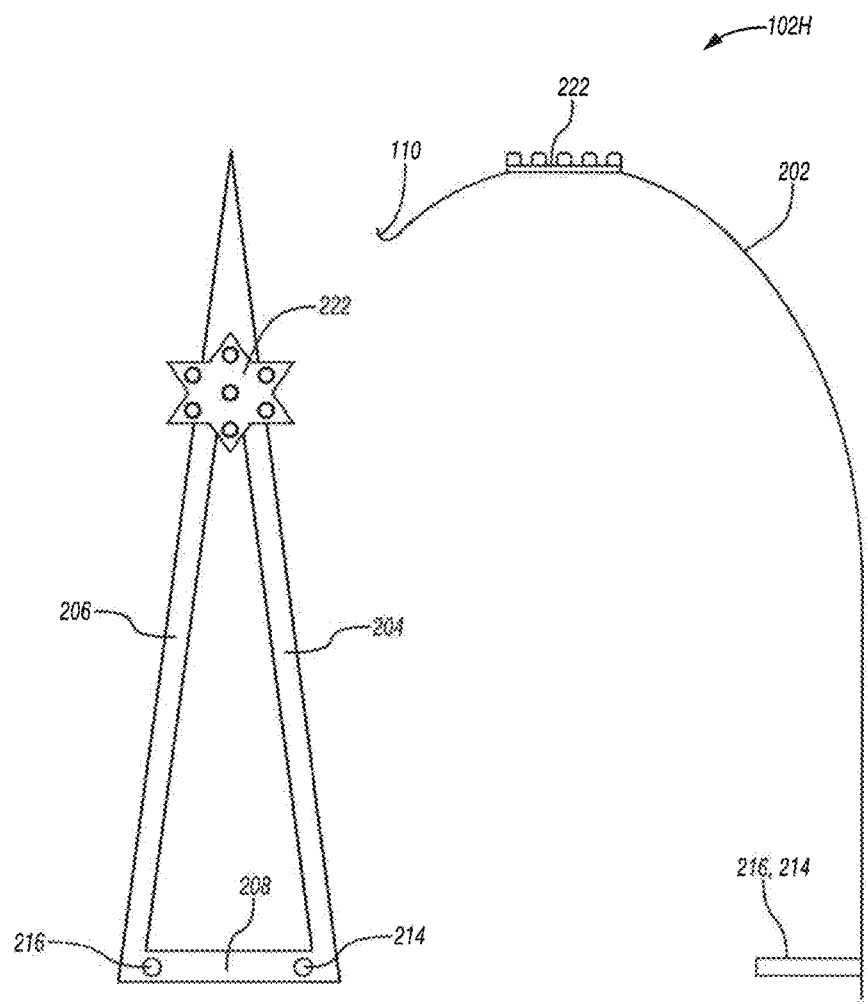
FIG. 2G illustrates an example embodiment of a hanging assembly having a star-shaped upper candle plate.

Turning now to FIG. 2G an example embodiment of a hanging assembly 102 is shown, specifically a hanging assembly with a star-shaped upper candle rack 102H. A hanging assembly with a star-shaped upper candle rack 102H may comprise each aspect of a hanging assembly 102A and further include a star-shaped plate (as illustrated) 222 disposed on the top of the neck portion 202, for example, at its apex, and configured to support one or more candle.

Figure 2H:
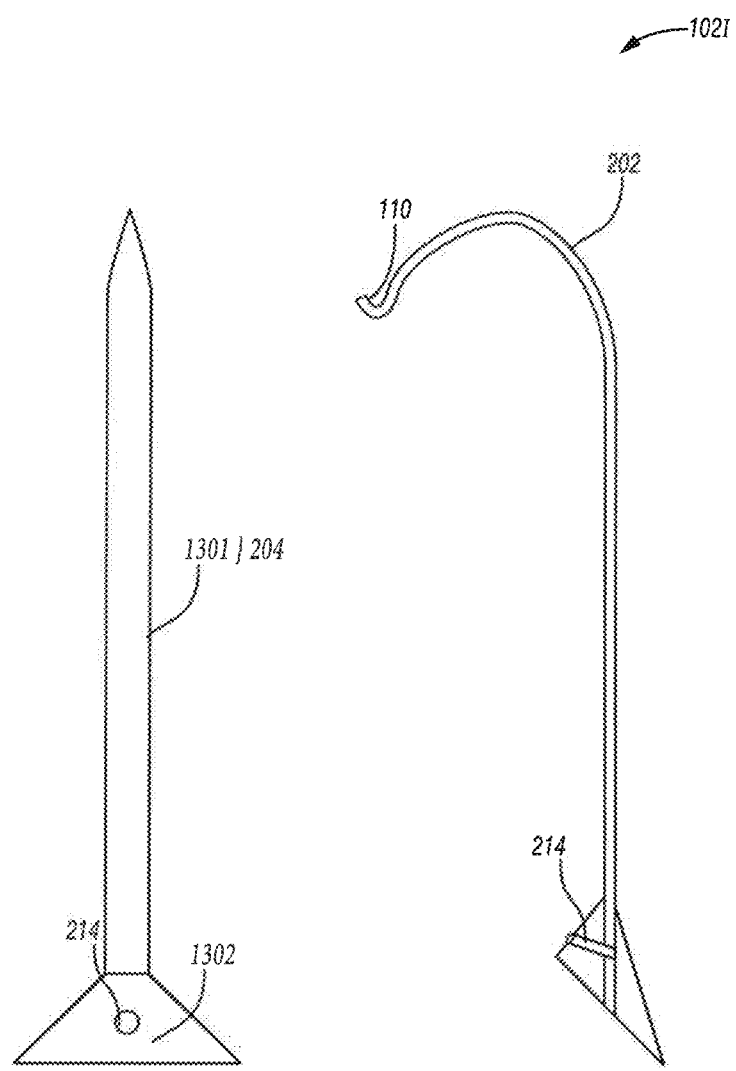
FIG. 2H illustrates an example embodiment of a hanging assembly having single arm and widened base aspect.

FIG. 2H illustrates an example embodiment of a single arm hanging assembly 102I which may be similar to a hanging assembly 102A except omitting the second arm 206 and optionally the second support member 216 and having other aspects as described. The hanging assembly 102I includes a hook portion 110. The hook portion 110 is connected to a neck portion 202, which is supported by a single arm 204. Proximate to the end of the first arm 204 is a first support member 214. In some embodiments, the hanging assembly 102I is connectable or attachable to the base tray by inserting the first support member 214 into an opening in the base tray. In other embodiments, the hanging assembly 102I is connected or attached to the base tray by inserting the first support member 214 underneath the base tray. The hanging assembly 102I may be formed of any sturdy material such as, for example, hardened plastic or stainless steel. The first arm 204 may comprise a widened profile extension member 1301, which may be a planar member having a wider direction and a narrower direction. In this manner, the resiliency of the first arm 204 to bend in one degree of freedom may be constrained. The first arm 204 may further comprise a base aspect 1302 comprising a widened portion at the end of the first arm 204 shared by the first support member 214. The base aspect 1302 may be triangular or any other shape as desired to aid resilience of the first arm 204 and may be contactable against a supporting surface, such as to maintain the first arm 204 extending in a desired direction, such as upwardly from a base tray.

Figure 2I:
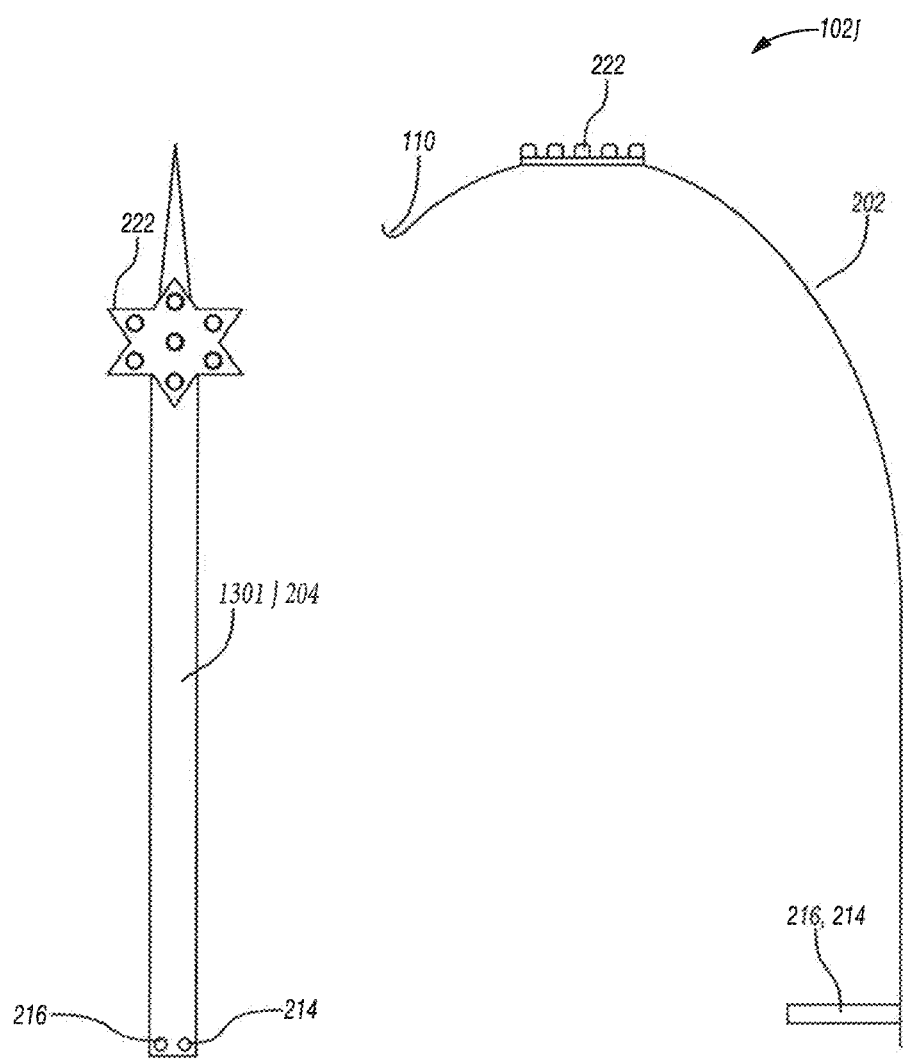
FIG. 2I illustrates an example embodiment of a hanging assembly having a star-shaped upper candle plate and a single arm.

FIG. 2I illustrates an example embodiment of a single arm hanging assembly 102J which may be similar to a hanging assembly 102A except omitting the second arm 206 but having both a first support member 214 and a second support member 216 and having other aspects as described. The hanging assembly 102J includes a hook portion 110. The hook portion 110 is connected to a neck portion 202, which is supported by a single arm 204. At the end of the first arm 204 is a first support member 214 and a second support member 216. In some embodiments, the hanging assembly 102J is connectable or attachable to the base tray by inserting the first support member 214 and the second support member 216 into openings in the base tray. In other embodiments, the hanging assembly 102J is connected or attached to the base tray by inserting the first support member 214 and the second support member 216 underneath the base tray. The hanging assembly 102J may be formed of any sturdy material such as, for example, hardened plastic or stainless steel. The first arm 204 may comprise a widened profile extension member 1301, which may be a planar member having a wider direction and a narrower direction. In this manner, the resiliency of the first arm 204 to bend in one degree of freedom may be constrained. The hanging assembly 102J may comprise an upper candle rack 222 such as a rod, plate (as illustrated), ring, or other structure disposed on the top of the neck portion 202, for example, at its apex, and configured to support one or more candle.

Figure 3A:
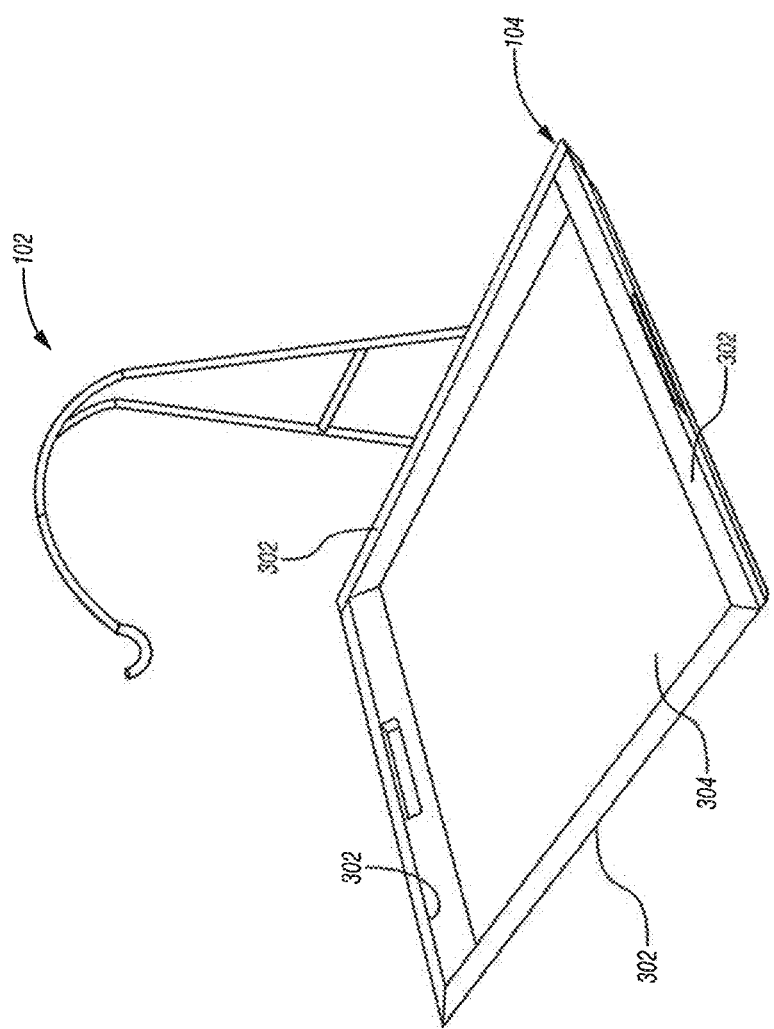
FIG. 3A illustrates a hanging assembly connected to a base tray in accordance with an embodiment of the present disclosure.
Figure 3B:
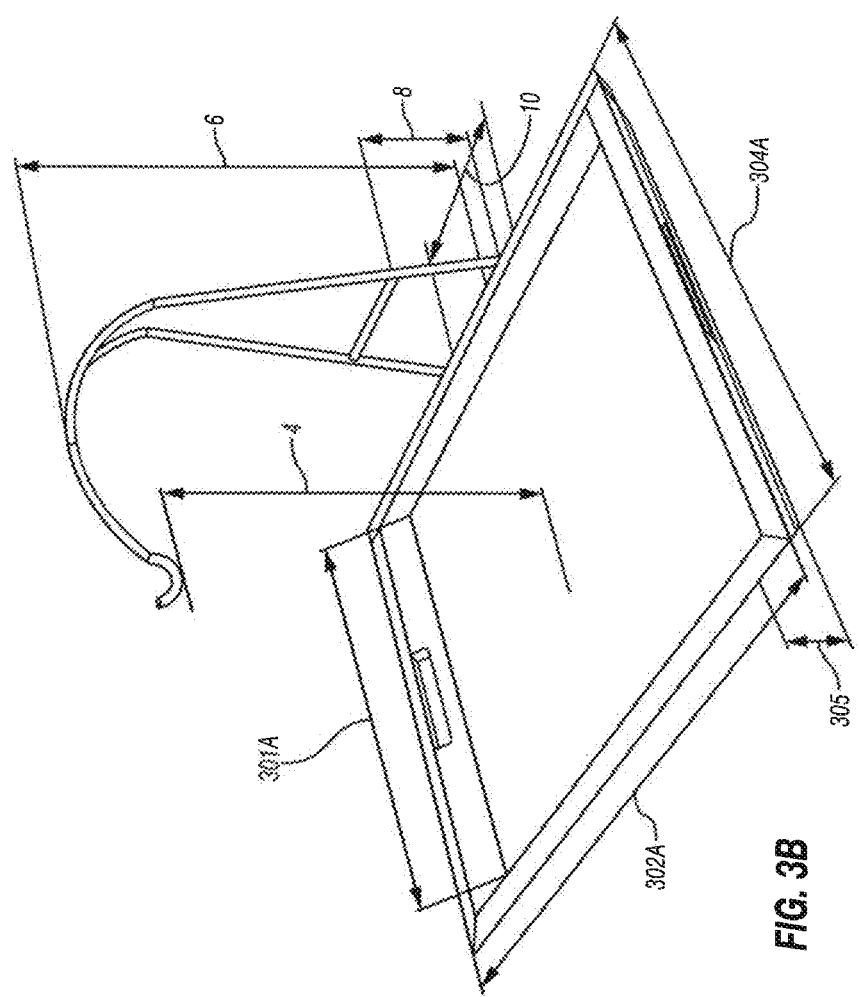
FIG. 3B illustrates example dimensions of an example embodiment of a hanging assembly connected to a base tray according to FIG. 3A.
Figure 3C:
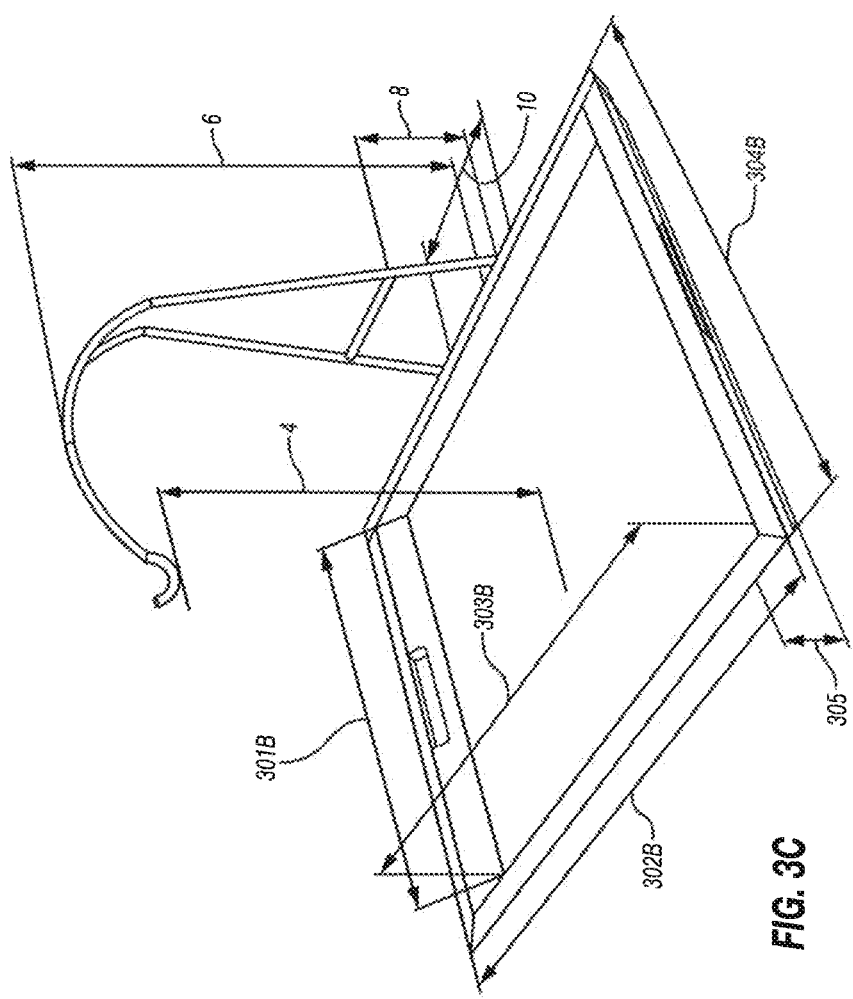
FIG. 3C illustrates further example dimensions of a further example embodiment of a hanging assembly connected to a base tray according to FIG. 3A.

FIG. 3A illustrates the hanging assembly 102 connected to the base tray 104. The base tray 104 is designed to support the hanging assembly 102 such that stress applied by the weight of the edible piñata 100 that is suspended is distributed along the base tray 104. This allows the combination of the base tray 104, hanging assembly 102, and hanging rod 106 to support and suspend the edible piñata 100 that is filled. In some embodiments, the base tray 104 also acts to catch the contents of the edible piñata 100 when the edible piñata 100 is broken while being suspended. This allows for the edible piñata 100 and its filling to be consumed in a controlled manner. In some embodiments, the base tray 104 may include walls 300, 302 and a floor surface 307 as shown in FIGS. 3A-C. It should be appreciated that the hanging assembly 102 may be attached to the base tray 104 by a variety of methods other than those disclosed herein. For example, the support members 214 and 216 may be formed such that they attach along the top of a wall 300, 302 of the base tray 104.

FIG. 3B illustrates various dimensions of various aspects of the hanging assembly 102 connected to the base tray 104 depicted in FIG. 3A. For example, the base tray 104 may have a first floor surface length 303A comprising a distance along a longer edge of the floor surface 307 of the base tray 104 and a first floor surface width 301A comprising a distance along a shorter edge of the floor surface 307 of the base tray 104. Similarly, the base tray 104 may have a first wall length 302A comprising a distance along a longer exterior edge of a longer wall 302 of the base tray 104 and a first wall width 304A comprising a distance along the shorter exterior edge of a shorter wall 300 of the base tray 104. In various embodiments, the first wall length 302A is greater than the first floor surface length 303A and similarly the first wall width 304A is greater than the first floor surface width 301A because of the thickness of the material providing the base tray 104. The base tray 104 may also have a base tray height 305 measuring the distance that at least one of the walls 300, 302 extends above a surface on which the base tray 104 is resting.

In various embodiments, the first floor surface width 301A comprises a distance between about 17 inches (about 43.18 cm) and about 19 inches (about 48.26 cm). For example, the first floor surface width 301A may comprise about 18 inches (about 45.72 cm). The first floor surface length 303A may comprise a distance between about 23 inches (about 58.42 cm) and about 25 inches (about 63.5 cm). For example, the first floor surface length 303A may comprise about 24 inches (about 60.96 cm). The first wall width 304A may comprise a distance between about 20 inches (about 50.8 cm) and about 22 inches (about 55.88 cm). For example, the first wall width 304A may comprise about 21 inches (about 53.34 cm). The first wall length 302A may comprise a distance between about 27 inches (about 68.58 cm) and about 29 inches (about 73.66 cm). For example, the first wall length 302A may comprise about 28 inches (about 71.12 cm). The base tray height 305 may comprise a distance between about 1 inch (about 2.54 cm) and about 3 inches (about 7.62 cm). For example, the base tray height 305 may comprise about 1.75 inches (about 4.445 cm).

FIG. 3C illustrates various dimensions of various aspects of the hanging assembly 102 connected to the base tray 104 depicted in FIG. 3A. For example, the base tray 104 may have a second floor surface length 303B comprising a distance along a longer edge of the floor surface 307 of the base tray 104 and a second floor surface width 301B comprising a distance along a shorter edge of the floor surface 307 of the base tray 104. Similarly, the base tray 104 may have a second wall length 302B comprising a distance along a longer exterior edge of a longer wall 302 of the base tray 104 and a second wall width 304B comprising a distance along the shorter exterior edge of a shorter wall 300 of the base tray 104. In various embodiments, the second wall length 302B is greater than the second floor surface length 303B and similarly the second wall width 304B is greater than the second floor surface width 301B because of the thickness of the material providing the base tray 104. The base tray 104 may also have a base tray height 305 measuring the distance that at least one of the walls 300, 302 extends above a surface on which the base tray 104 is resting.

In various embodiments, the second floor surface width 301B comprises a distance between about 14 inches (about 35.56 cm) and about 16 inches (about 40.61 cm). For example, the second floor surface width 301B may comprise about 15 inches (about 38.1 cm). The second floor surface length 303B may comprise a distance between about 19 inches (about 48.26 cm) and about 21 inches (about 53.34 cm). For example, the second floor surface length 303B may comprise about 20 inches (about 50.8 cm). The second wall width 304B may comprise a distance between about 17 inches (about 43.18 cm) and about 19 inches (about 48.26 cm). For example, the second wall width 304B may comprise about 18 inches (about 45.72 cm). The second wall length 302B may comprise a distance between about 23 inches (about 58.42 cm) and about 25 inches (about 63.5 cm). For example, the second wall length 302B may comprise about 24 inches (about 60.96 cm). The base tray height 305 may comprise a distance between about 1 inch (about 2.54 cm) and about 3 inches (about 7.62 cm). For example, the base tray height 305 may comprise about 1.75 inches (about 4.445 cm).

Figure 4:
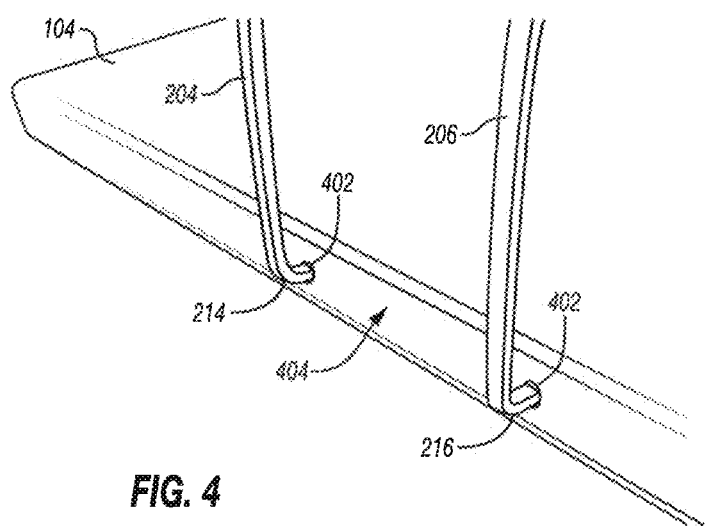
FIG. 4 illustrates an example embodiment of a hanging assembly attached to a base tray.

Referring briefly to FIG. 4, the hanging assembly 102A (FIG. 1) is shown attached to the base tray 104 by inserting the first and second support members 214 and 216 into openings 402 in a side 404 the base tray 104.

Figure 5:
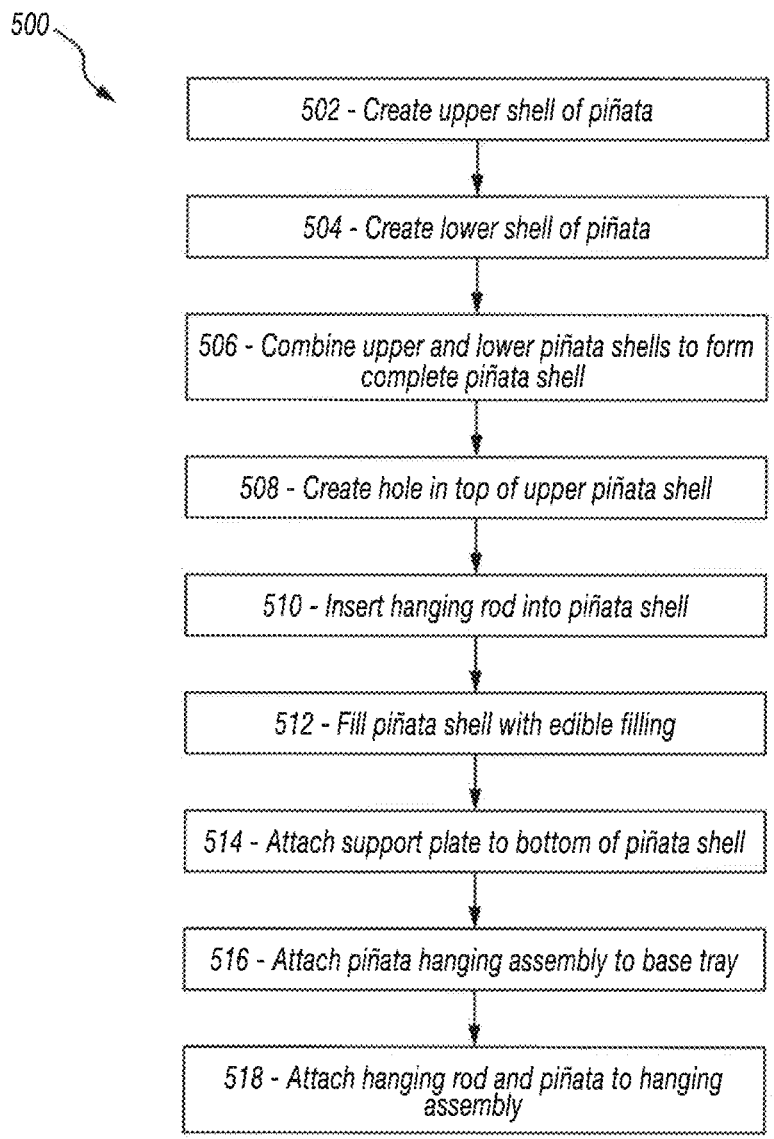
FIG. 5 illustrates an example flow chart of a method for producing an edible piñata in accordance with one or more embodiments of the present disclosure.
Figure 6:
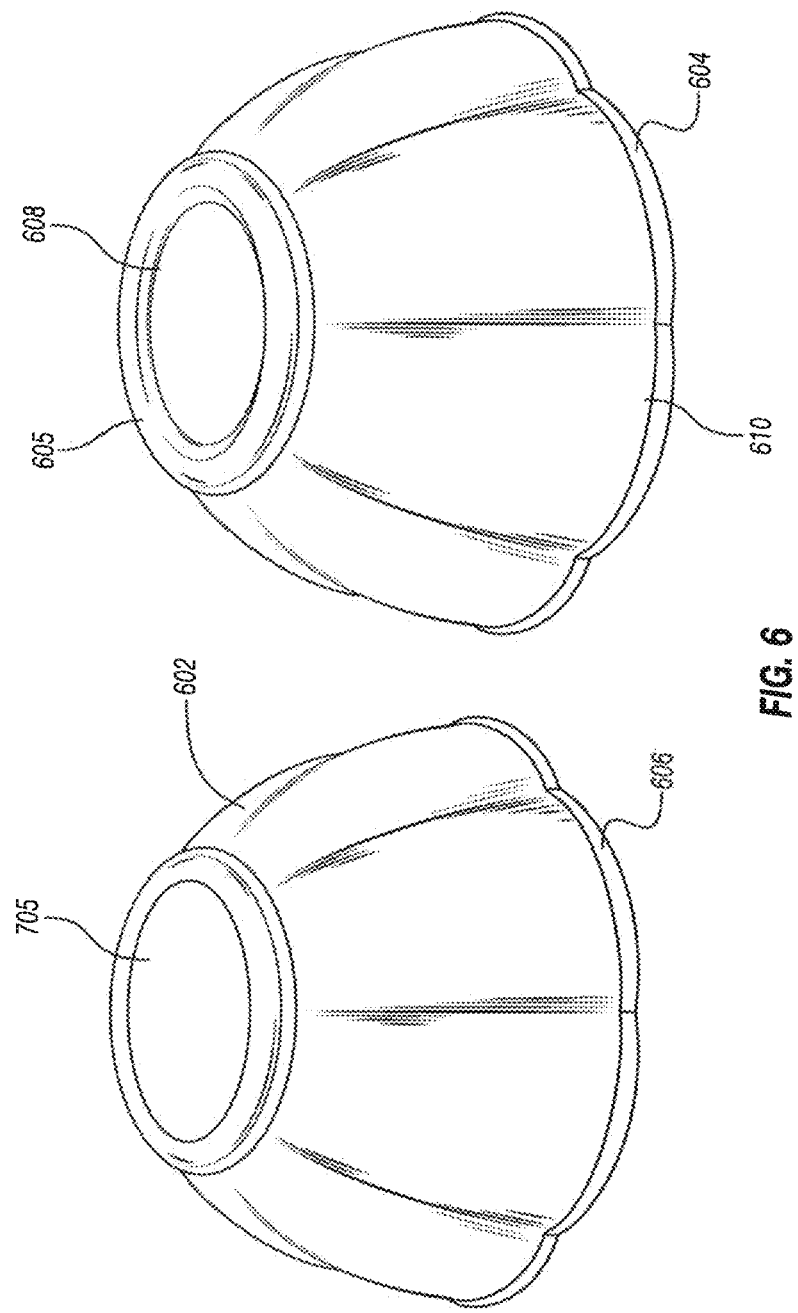
FIG. 6 illustrates an example embodiment of an upper shell and a lower shell of the edible piñata.

An example flow diagram 500 is illustrated in FIG. 5 and described below with reference to FIGS. 6-14. The flow diagram 500 illustrates an example method for producing an edible piñata in accordance with an embodiment of the present disclosure. In the present embodiment, the piñata is formed from two shells made of an edible material such as, for example, chocolate. FIG. 6 illustrates the two shells: an upper shell 602 and a lower shell 604. The upper shell 602 is positioned right-side-up with the uppermost surface 705 positioned up, and its rim 606 positioned down. The lower shell 604 is positioned upside-down with the lowermost surface 605 positioned up and its rim 610 positioned down. An opening 608 is formed in the lower shell 604. As explained in detail below, this opening allows the piñata to be filled.

At step 502 of FIG. 5, the upper shell 602 of the piñata is formed. In some embodiments, this involves heating/melting the edible material until it is in a liquid phase, and then pouring the melted material into a mold that is shaped to form the upper shell 602. Once the melted material is poured into the mold, it may, in some embodiments, be shaken to evenly coat the interior of the mold and create a first layer of the upper shell 602. As the material is shaken within the mold, excess material is poured out of the mold. This shaking and excess removal of the material when coating the interior surface of the mold provides an even distribution of the material to create a substantially uniform first layer of the shell. This prevents the shell from being uneven, which compromises the structural integrity of the shell and the formed piñata. The first layer of the upper shell 602 may, in some embodiments, be approximately 2-3 mm (about 0.0787 inches to about 0.118 inches) in thickness. Once the first layer is formed, the mold containing the first layer of the upper shell 602 is then cooled to harden the first layer. In some embodiments, the first layer is cooled for two minutes at an ambient temperature of approximately 38° F. (about 3.33° C.) to approximately 40° F. (about 4.44° C.).

Figure 7:
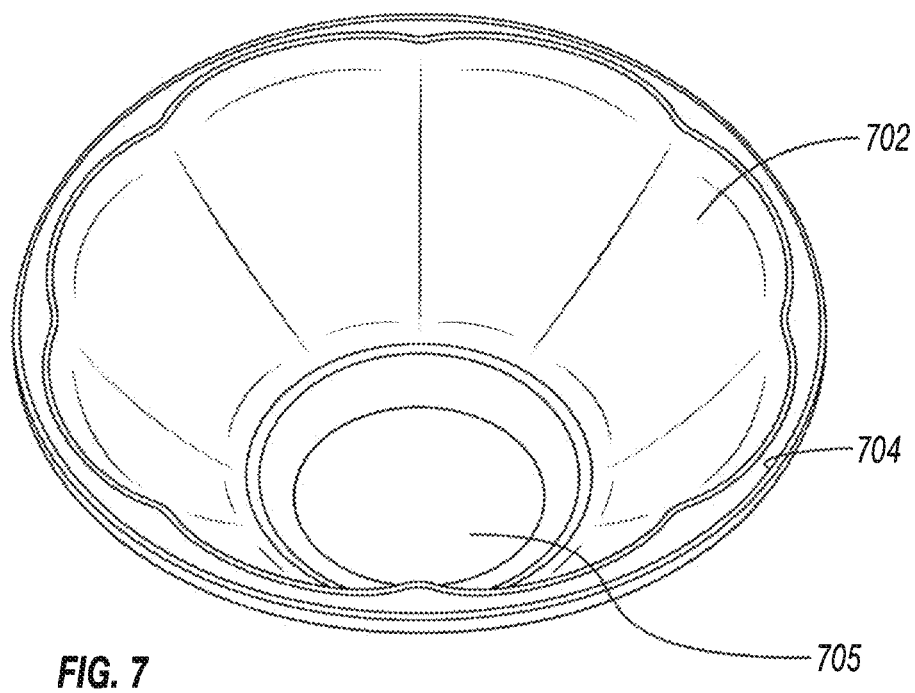
FIG. 7 illustrates an example embodiment of a first layer of an upper piñata shell poured into a mold.

FIG. 7 illustrates an example embodiment of a first layer 702 of the upper shell poured into a mold 704. The shell in FIG. 7 is positioned upside-down with the uppermost surface 705 of the upper shell positioned at the bottom of the mold 704.

After the first layer is formed, the melted material is then applied to the cooled first layer to form a second layer of the upper shell 602. The second layer reinforces the strength of the first layer and repairs or fills any holes or thin portions present in the first layer. In some embodiments, the material used to create the second layer is at a cooler temperature than the material used to pour the first layer. This helps to prevent the second layer from melting or weakening the first layer of the upper shell 602. In some embodiments, the second layer may be approximately 1-2 mm (about 0.0394 inches to about 0.0787 inches) in thickness. In some embodiments, the second layer is applied by using a spoon or other utensil to place the melted material over the first layer. In some embodiments, the second layer is not applied to the uppermost surface 705 of the upper shell 602. This allows for easier placement of an opening in the top of the piñata (as discussed below) for inserting the hanging rod 106.

Once the second layer is applied to the upper shell 602, the upper shell 602 is cooled to harden both the first and second layers of the upper shell 602. For example, the upper shell 602 may be cooled for 10-15 minutes at an ambient temperature of approximately 0° F. (about −17.8° C.) to approximately −2° F. (about −18.9° C.).

At step 504 of FIG. 5, the lower shell 604 of the piñata is formed. This process is similar to that in step 502, with a few notable exceptions. Namely, the preparation for the opening in the bottom of the piñata. In some embodiments, forming the lower shell 604 involves heating/melting the edible material until it is in a liquid phase, and then pouring the melted material into a mold that is shaped to form the lower shell 604. Once the melted material is poured into the mold, it may, in some embodiments, be shaken to evenly coat the interior of the mold and create a first layer of the lower shell 604. As the material is shaken within the mold, excess material is poured out of the mold. This shaking and excess removal of the material when coating the interior surface of the mold provides an even distribution of the material to create a substantially uniform first layer of the shell. This prevents the shell from being uneven, which compromises the structural integrity of the shell and the formed piñata. The first layer of the lower shell 604 may, in some embodiments, be approximately 2-3 mm (about 0.0787 inches to about 0.118 inches) in thickness.

Once the first layer is formed, a ring (see FIG. 8) is placed in the bottom of the mold to create a round separation of the first layer. This round separation of the first layer will ultimately form the opening 608 at the bottom of the lower shell 604 and piñata. The mold containing the first layer of the lower shell 604 is then cooled to harden the first layer. In some embodiments, the first layer is cooled for two minutes at an ambient temperature of approximately 38° F. (about 3.33° C.) to approximately 40° F. (about 4.44° C.).

Figure 8:
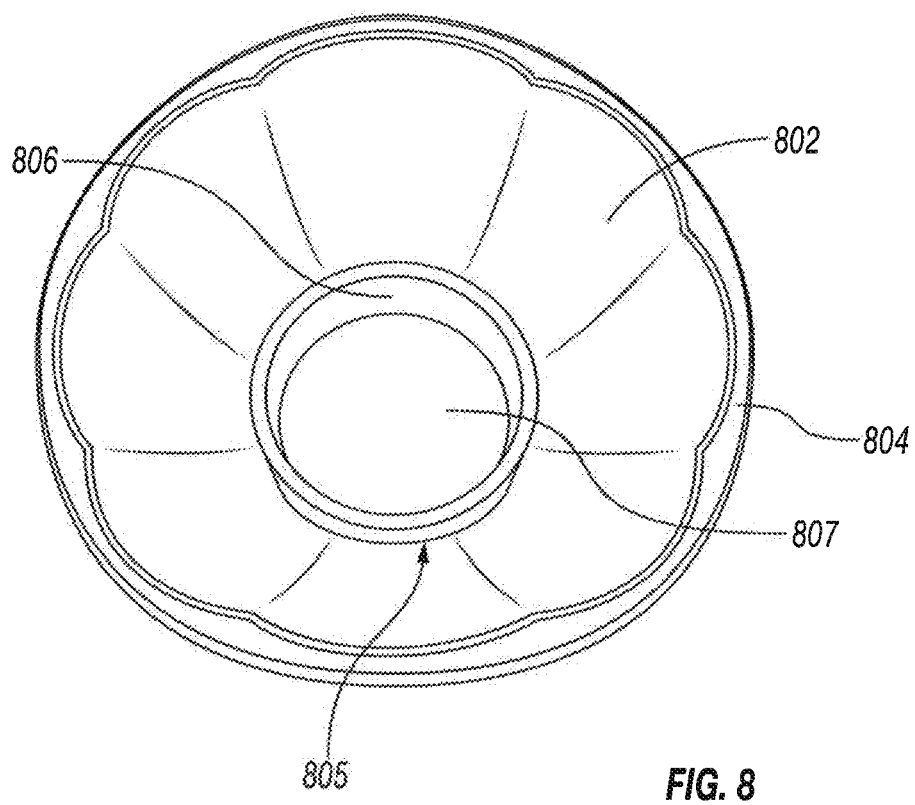
FIG. 8 illustrates an example embodiment of a first layer of a lower piñata shell poured into a mold.

FIG. 8 illustrates an example embodiment of a first layer 802 of the lower shell poured into a mold 804. The shell in FIG. 8 is shown with a ring 806 placed in the lowermost surface 805 of the first layer, which is positioned at the bottom of the mold 804. This creates a separated portion 807 of the first layer, which ultimately becomes the opening 608 in the lower shell 604.

After the first layer is formed, the melted material is then applied to the cooled first layer to form a second layer of the lower shell 604. The second layer reinforces the strength of the first layer and repairs or fills any holes or thin portions present in the first layer. In some embodiments, the material used to create the second layer is at a cooler temperature than the material used to pour the first layer. This helps to prevent the second layer from melting or weakening the first layer of the lower shell 604. In some embodiments, the second layer may be approximately 1-2 mm (about 0.0394 inches to about 0.0787 inches) in thickness. In some embodiments, the second layer is applied by using a spoon or other utensil to place the melted material over the first layer. In some embodiments, the second layer is not applied to the lowermost surface 805 of the lower shell 604. In some embodiments, the second layer is also not applied to the separated portion 807 of the first layer. This allows for easier removal of the ring 806 and separated portion 807 to form the opening 608 in the bottom of the piñata.

Once the second layer is applied to the lower shell 604, the lower shell 604 is cooled to harden both the first and second layers of the lower shell 604. For example, the lower shell 604 may be cooled for 10-15 minutes at an ambient temperature of approximately 0° F. (about −17.8° C.) to approximately −2° F. (about −18.9° C.).

At step 506 of FIG. 5, the upper shell 602 and lower shell 604 is combined to form a completed shell of the piñata. Once the upper shell 602 and lower shell 604 are sufficiently cooled, they are removed from their respective molds. For the lower shell 604, this involves removing the ring 806 and the separated portion 807 of the first layer to create the opening 608 in the lower shell 604 of the piñata. The mold 804 is then positioned upside-down, and pressure is applied to the mold at a location adjacent the perimeter of the lowermost surface 805 to separate the lower shell 604 from the mold 804. Similarly, the upper shell 602 is removed from its mold 704 by placing the mold 704 upside-down and applying pressure to the mold 704 at a location adjacent the perimeter of the uppermost surface 705 of the upper shell 602. Applying the pressure near the perimeters of the lowermost surface 805 and uppermost surface 705 distributes the pressure along the structure of the upper and lower shells 602 and 604, which prevents the lower and upper shells 604 and 602 from breaking while being separated from the molds.

Figure 9:
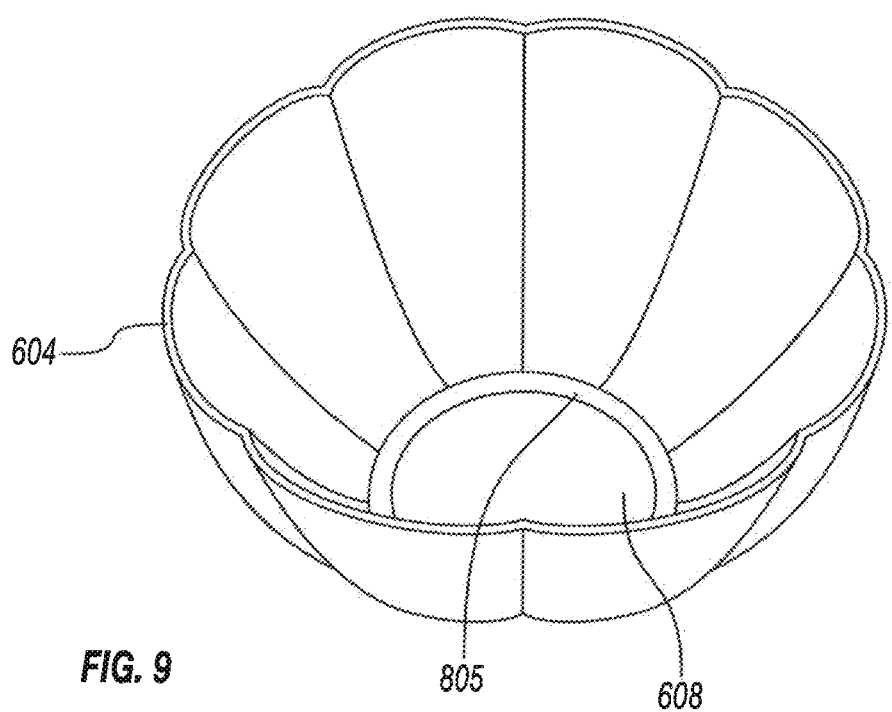
FIG. 9 illustrates an example embodiment of the lower piñata shell after being removed from its mold.

FIG. 9 illustrates an example embodiment of the lower shell 604 after being removed from its mold 804. As shown in FIG. 9, the opening 608 is formed in the lowermost surface 805 of the lower shell 604.

Figure 10:
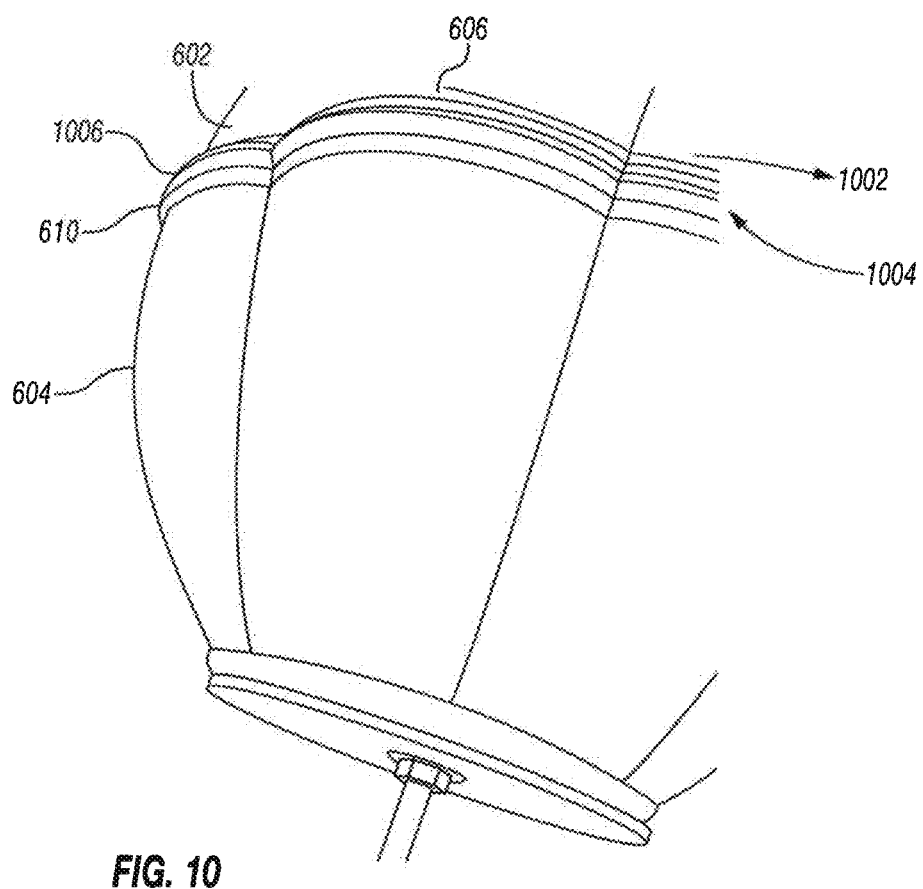
FIG. 10 illustrates an example embodiment of the upper piñata shell and lower piñata shell combined to form the complete piñata shell.

Once the shells are removed from their respective molds, the shells are heated at the perimeter/rim of each shell to slightly melt the edible material forming the shells. Specifically, the edge of the upper shell 602 is heated along its rim 606, and the edge of the lower shell 604 is heated along its rim 610. The two melted rims 606 and 610 are then placed together thereby forming a seal to bind the upper shell 602 to the lower shell 604. Referring briefly to FIG. 10, the seal may be reinforced, in some embodiments, by wiping the melted material at each rim 606 and 610 in a direction 1002 along the circumference 1004 of the combined rims, thereby reinforcing the seal and creating a seam 1006 along the circumference 1004 of the piñata 1005.

Figure 11:
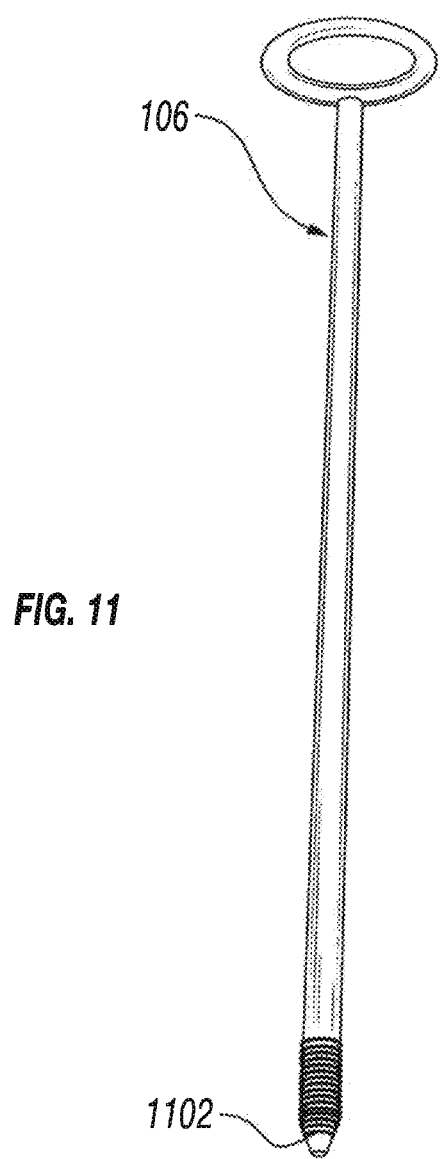
FIG. 11 illustrates an example embodiment of a hanging rod.

At step 508 of FIG. 5, a hole is formed in the uppermost surface 705 of the piñata. Referring briefly to FIGS. 1 and 11, the hole may be formed, in some embodiments, by heating the threaded end 1102 of the hanging rod 106 and applying the threaded end 1102 that is heated to the center of the uppermost surface 705 of the piñata in a downward direction. This slightly melts the uppermost surface 705 of the piñata, thereby allowing the threaded end 1102 to penetrate the uppermost surface 705 to create the hole 105.

In some embodiments, the assembled piñata shell is cooled for a sufficient period of time to harden the piñata shell so that it shatters when being broken by a consumer for consumption. For example, in some embodiments, the piñata shell is cooled for an hour or more at an ambient temperature of approximately 0° F. (about −17.8° C.) to approximately −2° F. (about −18.9° C.). In some embodiments, the hardened piñata shell remains in the cool environment until one or more of steps 510-518 commence. In some embodiments, the hardened piñata shell remains in the cooled environment until after step 518 is complete, and is then brought to the consumer directly from the cooled environment.

At step 510 of FIG. 5, the hanging rod 106 is then inserted into the piñata by placing the hanging rod 106 through the hole 105 such that the threaded end 1102 extends through the hole 105 and into the hollow interior of the piñata shell.

At step 512 of FIG. 5, the piñata is then filled with edible contents. To do this, the piñata is turned upside-down, and the contents are inserted into the hollow interior of the piñata shell through the opening 608 in the lower shell 604 of the piñata. The contents of the edible piñata may include any edible material such as, for example, fruits, candy, fried items, sauces, or any other edible item. In some embodiments, the hanging rod 106 should be able to extend to or beyond the opening 608 once the piñata is filled.

Figure 12:
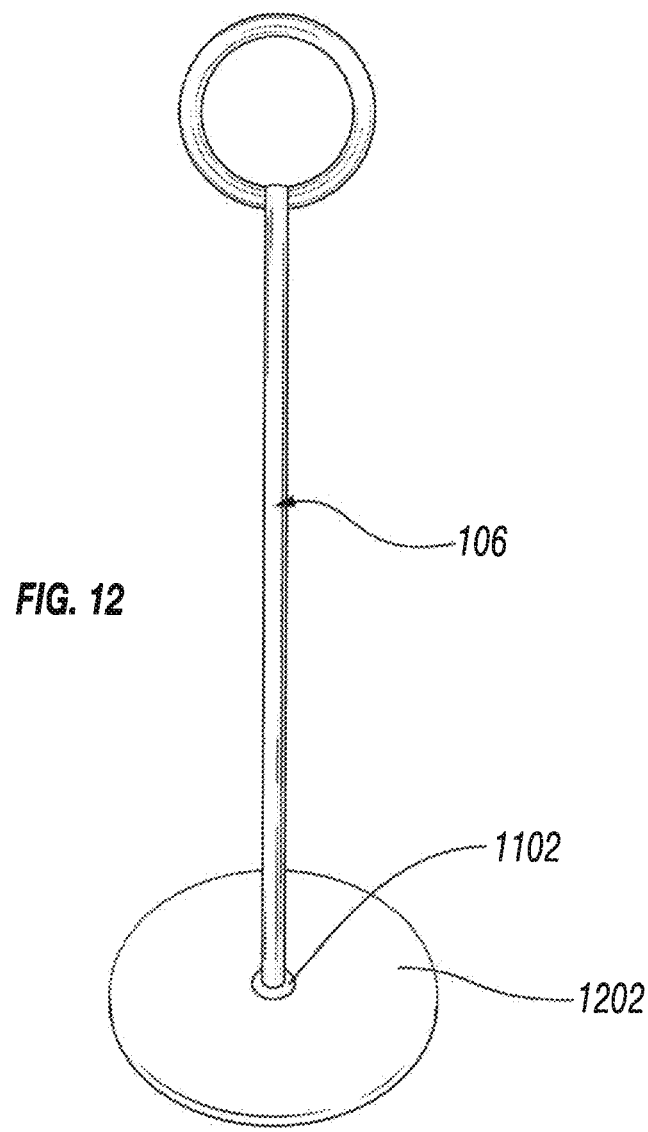
FIG. 12 illustrates an example embodiment of a hanging rod attached to a support plate.

As previously discussed, the piñata is supported, at least in part, by the hanging rod 106 and a support plate. FIG. 12 illustrates an example embodiment of the hanging rod 106 and the support plate 1202 attached at the threaded end 1102 of the hanging rod 106. In some embodiments, the support plate 1202 may be attached to the threaded end 1102 of the hanging rod 106 by a nut or other suitable means for mating the support plate 1202 with the hanging rod 106.

Figure 13:
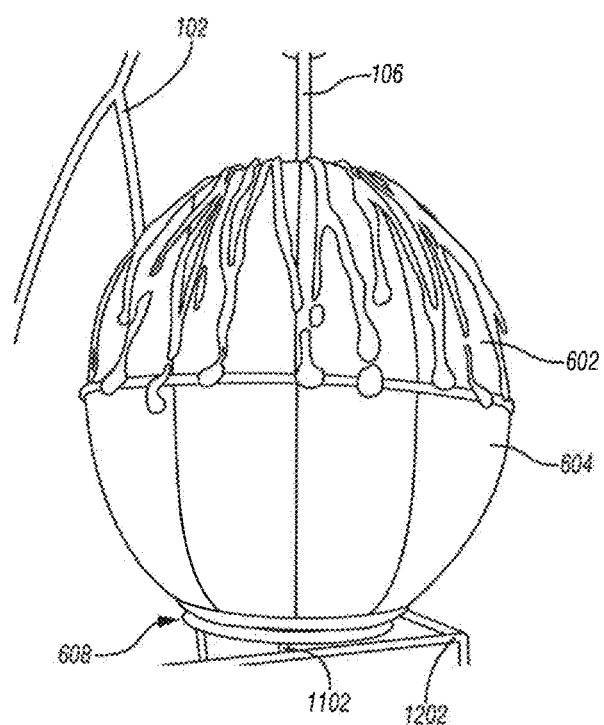
FIG. 13 illustrates an example embodiment of the edible piñata attached to the hanging rod and support plate.

At step 514 of FIG. 5, the support plate 1202 is attached to the threaded end of the hanging rod 106, and the piñata is then turned right-side-up and lowered onto the support plate 1202. The shell of the piñata supports the weight of the contents while the piñata is turned right-side-up, and the support plate 1202 is used to cover the opening 608 at the bottom of the piñata to keep the contents from spilling out of the piñata shell. As shown in FIG. 13, the support plate 1202 acts as a bottom surface to cover the opening 608 at the bottom of the piñata and to, at least partially, support at least a portion of the weight of the piñata and its contents when the piñata is in its upright position. The piñata and its contents are thus supported by the structure of the piñata shell, the support plate 1202, and the hanging rod 106.

At step 516 of FIG. 5, the hanging assembly 102A is then attached to the base tray 104 as discussed above. In some embodiments, the edible piñata 100, hanging assembly 102A, and/or base tray 104 may be decorated or otherwise modified in preparation for serving the edible piñata 100.

At step 518, the hanging rod 106 and edible piñata 100 are attached to the hanging assembly 102A by placing the ring portion 108 of the hanging rod 106 onto the hook portion 110 of the hanging assembly 102A. In accordance with the foregoing, the piñata shell, support plate 1202, hanging rod 106, hanging assembly 102A, and base tray 104 act to support the edible piñata 100 that is suspended so that it may be broken and consumed.

Figure 14:
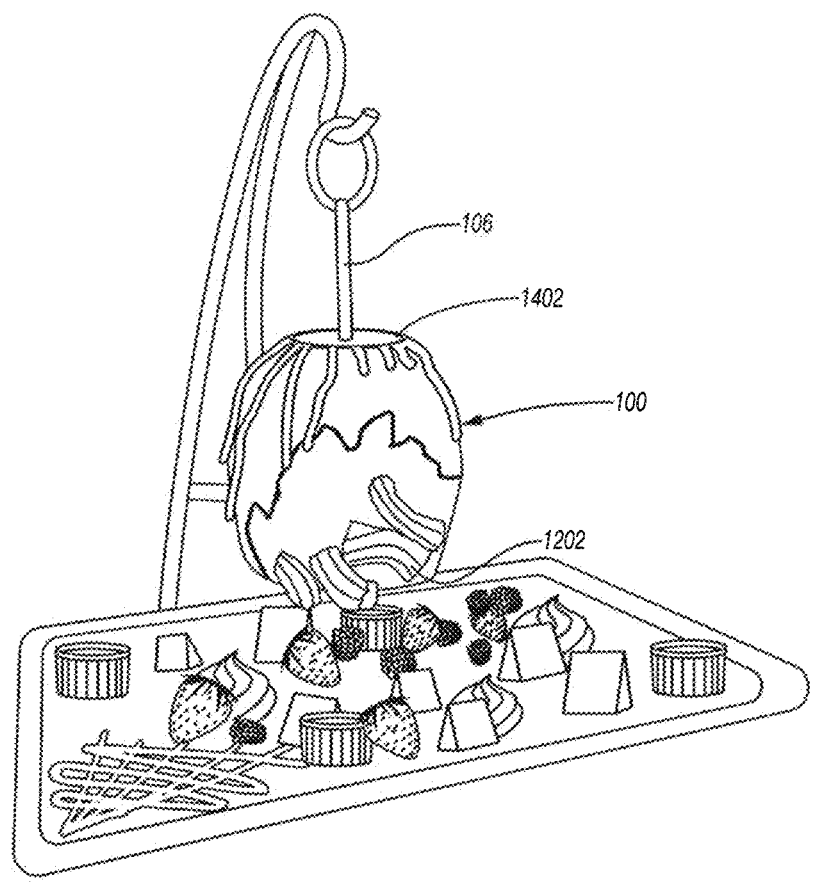
FIG. 14 illustrates an example embodiment of an edible piñata after being broken for consumption.

As shown in FIG. 14, in some embodiments, when the edible piñata 100 is broken to be consumed, any remaining portion 1402 of the broken piñata acts with the support plate 1202 and hanging rod 106 to retain some of the edible contents of the edible piñata 100 so that the edible contents may remain within and supported by the remaining portion 1402 of the broken piñata while being consumed. In some embodiments, the edible piñata 100 is maintained at a cold temperature until it is presented to a consumer so that the piñata shatters and leaves the remaining portion 1402 of the broken piñata when broken by the consumer.

The foregoing method descriptions and the flow diagrams are provided merely as illustrative examples and are not intended to require or imply that the steps of the various embodiments must be performed in the order presented. The steps in the foregoing embodiments may be performed in orders other than those described herein. Words such as "then," "next," etc., are not intended to limit the order of the steps; these words are simply used to guide the reader through the description of the methods. Although flow diagrams may describe the steps as a sequential process, many of the steps can be performed in parallel or concurrently. In addition, the order of the steps may be rearranged.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A system comprising:
    an edible piñata including an edible upper shell and an edible lower shell, each of the edible upper shell and the edible lower shell having rims fused as a single unitary piece of edible material defining a hollow interior,
    wherein the edible lower shell further comprises an opening defined through the edible piñata wherein the edible upper shell further comprises a hole defined through the edible piñata, wherein the hole is smaller than the opening;

an edible filling inside the hollow interior of the single unitary piece of edible material and passable through the opening;

a hanging assembly extending upwardly from outside a perimeter edge of a base tray and comprising a hook;

a hanging rod comprising a shaft with a threaded end and a ring opposite the threaded end;

the ring connected to the hook of the hanging assembly;

the shaft extending downwardly from the ring connected to the hook of the hanging assembly and toward the base tray, the shaft hanging above a face of the base tray and inward of the perimeter edge of the base tray;

the hanging rod extending into the hole of the edible upper shell, and passing through the hollow interior, and extending outwardly from the opening opposite the hole, the hanging rod supporting under tensile load, the edible piñata from the hanging assembly in hanging relation above the face of the base tray; and a support plate for supporting the edible piñata, the support plate comprising a flat and circular shape with a diameter larger than a diameter of the opening, the support plate occluding the opening, the support plate attached to the threaded end of the hanging rod; and the edible lower shell resting directly against a first side of the support plate facing toward the opening, and the edible filling inside the interior cavity and at least a portion of the edible filling resting directly against the first side of the support plate facing toward the opening, and wherein the hanging assembly is configured to support the edible piñata and the hanging rod and the support plate above the base tray for consumption of the suspended edible piñata.

2. The system according to claim 1, wherein the edible piñata comprises:

the edible upper shell comprising:
a first layer of edible material providing a substantially uniform body;
an uppermost surface comprising a region of the first layer and wherein the hole is defined through the uppermost surface for receiving the hanging rod;
the rim comprising a distal edge of the first layer of edible material disposed opposite the uppermost surface and joinable to the edible lower shell;

the edible lower shell comprising:
a first layer of edible material providing a substantially uniform body;
a lowermost surface comprising a region of the first layer and wherein the opening is defined through the lowermost surface for receiving the edible filling; and
the rim comprising a distal edge of the first layer of edible material disposed opposite the lowermost surface and joinable to the rim of the edible upper shell.

3. The system according to claim 2, wherein the opening is coaxial with the hole.

4. The system according to claim 1, wherein the hanging assembly comprises:
a first arm comprising a first support member extending perpendicularly to the first arm, the first support member configured to be received within the base tray whereby the first arm is configured to extend upwardly from the base tray;
a second arm comprising a second support member extending perpendicularly to the second arm, the second support member configured to be received within the base tray whereby the second arm is configured to extend upwardly away from the base tray;
a neck portion extending away from a distal end of the first arm and a distal end of the second arm;
a hook portion comprising the hook disposed at a distal end of the neck portion and configured to support the hanging rod.

5. The system according to claim 4, wherein the neck portion comprises an arcuate member extending arcuately away from the distal end of the first arm and the distal end of the second arm.

6. The system according to claim 4, wherein the hanging assembly further comprises a cross bar member extending between the first arm and the second arm.

7. The system according to claim 2,
wherein the edible upper shell and the edible lower shell each comprise a second layer of edible material inward of the first layer of edible material providing the substantially uniform body, wherein the second layer of edible material reinforces the first layer.

\* \* \* \* \*